Sept. 8, 1931.  F. H. OWENS  1,821,946
MOTION PICTURE APPARATUS
Original Filed July 2, 1924    2 Sheets-Sheet 2
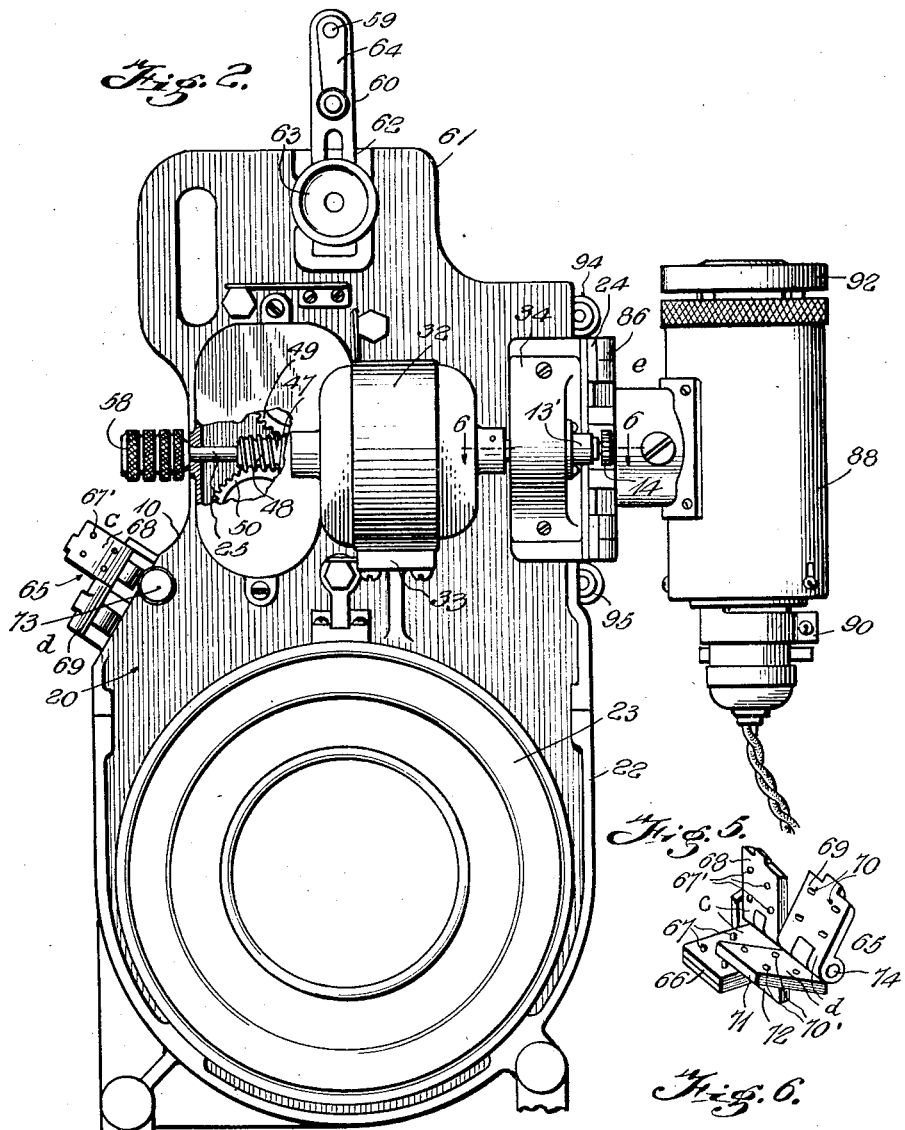
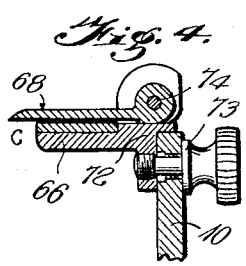
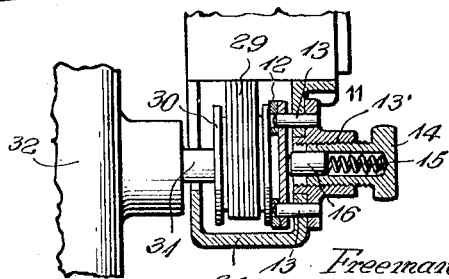
INVENTOR
Freeman H. Owens,
By John B. Brady
ATTORNEY Patented Sept. 8, 1931

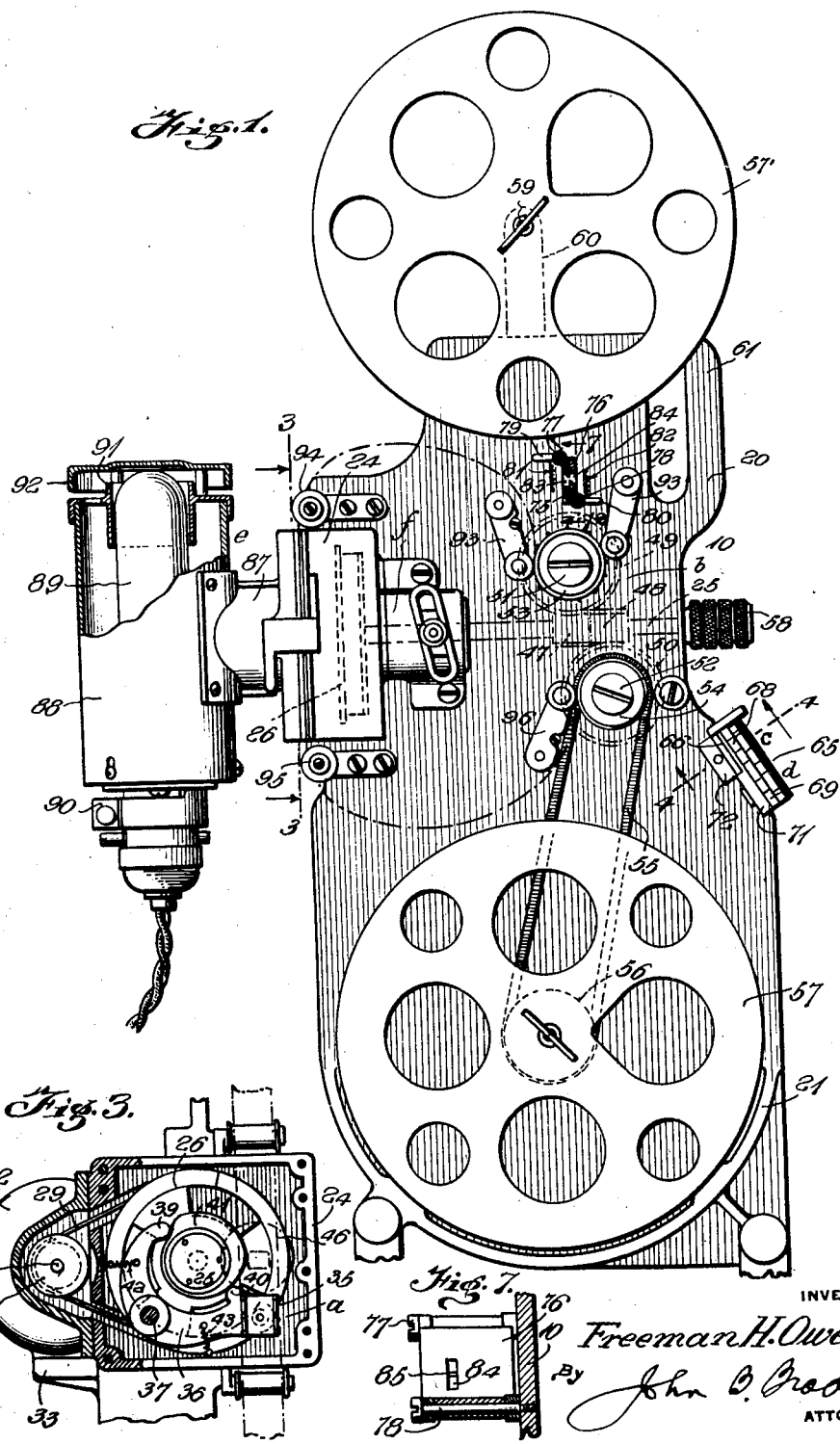

1,821,946

UNITED STATES PATENT OFFICE

FREEMAN H. OWENS, OF NEW YORK, N. Y.

MOTION PICTURE APPARATUS

Original application filed July 2, 1924, Serial No. 723,700. Divided and this application filed May 18, 1926. Serial No. 109,962.

This invention relates to motion picture apparatus, and has particular reference to the provision of an improved portable motion picture machine adapted for use with combined motion picture and sound record films.

This application is a division of my application, Serial No. 723,700, filed July 2, 1924.

A prime desideratum of my present invention comprehends the provision of an improved portable motion picture apparatus of the type disclosed in my United States Patent No. 1,684,968, dated September 18, 1928, in which the parts are designed, arranged and coordinated to produce a light-weight and compact portable organization and which is constructed and organized to efficiently serve as a combined motion picture machine, sound reproducing machine and film cutting and splicing machine.

More specifically, the principal objects of the present invention include the provision of a motion picture apparatus of the portable type which is designed to be employed with combined motion picture and sound record films; the further provision of a portable power-driven motion picture machine constructed to afford facile and convenient manual manipulation of the operated parts independently of the power driving mechanism, and the still further provision of a motion picture machine provided with a film cutting and splicing mechanism related to the film supply and take-up reels in a manner to permit the splicing or joining of film without the necessity of removing the reels from the machine, the machine being thus capable of service as a film cutter and splicer.

To the accomplishment of the foregoing and such other objects as will hereinafter appear, my invention consists in the elements and their relation one to the other, as hereinafter particularly described and sought to be defined in the claims; reference being had to the accompanying drawings which show the preferred embodiment of my invention, and in which:

Fig. 1 is a left side elevational view of the motion picture machine embodying my improvements, Fig. 2 is a right side elevational view of the same, Fig. 3 is a view taken in cross-section on the line 3—3 of Fig. 1 showing the intermittent film moving mechanism, Fig. 4 is a view of the film cutting and splicing mechanism taken on the line 4—4, Fig. 1, Fig. 5 is a perspective view of the film cutting and splicing mechanism, Fig. 6 is a view of a detail taken in cross-section on the line 6—6, Fig. 2, and Fig. 7 is a view of a film gate means for a sound record taken in cross-section on the line 7—7, Fig. 1.

Referring now more in detail to the drawings, the motion picture machine comprises a frame casting 10 designed to support the operating and operated parts of the machine, the frame casting including a vertical and main supporting wall 20, the bottom portion of which is provided with integral substantially semi-cylindrical sections 21 and 22 on opposite sides of the vertical wall section 20, the section 21 providing a housing for the take-up reel, and the section 22 providing a compartment for storing one or more additional reels 23. The casting frame 10 further includes an integral portion 24 at the rear thereof which forms a housing for the shutter and intermittent film moving mechanism, as will become clearer hereinafter.

For producing a machine having a relatively simple coordinated structure, the parts are correlated so as to effect a direct driving of the intermittent and continuous film feeding mechanisms from the shutter shaft with the minimizing of gearing therebetween, and a consequent elimination of loose play between parts. To accomplish this the shutter shaft 25 which carries the shutter 26 is journalled in suitable bearings provided by the vertical wall 20, and the said shutter shaft is utilized as the main drive for the intermittent and continuous film moving mechanisms, the shutter 26 being to this end designed as a combined shutter and drive wheel, the shutter being peripherally formed as particularly shown in Figs. 1 and 3 of the drawings to define a belt wheel over which is moved the driving belt 29 trained over a pulley 30 which is fixed to the shaft 31 of motor 32, the mount or base for which comprises an extension arm 33. The pulley 30 and the belt wheel may be protectively housed or encased by a pulley guard 34 which may be attached to the casing section 24 of the frame 10, as clearly shown in Figs. 2 and 3 of the drawings.

For sensitively controlling the speed of operation of the motor 32 and the main drive shaft 25, I have found it desirable to provide manually controllable means generally designated as 11 for variably braking the pulley 30, the said means comprising a friction disk 12 constrained to axial movement to and from one face of the pulley 30 by means of the pins 13 fixed to the guard 34 and the internally threaded element 13', which element threadedly receives a thumb screw 14 housing a spring 15, which spring is active on the plunger 16 for urging the disk 12 to pulley engaging or contacting position. By means of this construction I am enabled, upon manual rotation of the thumb screw 14, to increase or release the braking friction on the pulley 30 and sensitively control the speed of operation of the film moving mechanism.

The intermittent film moving mechanism generally designated as $a$ (Fig. 3) and the continuous film moving mechanism generally designated as $b$, are directly driven from the shutter shaft 25, the said mechanism being preferably located adjacent opposite ends of the shaft so as to produce a balanced operating machine. The intermittent film moving mechanism $a$ preferably comprises a film grip device 35 of the "slip claw" variety which is reciprocable by means of a cam follower or lever 36 which is pivoted as at 37, the said lever being provided with the oppositely positioned cam arms 39 and 40 which engage and follow a cam 41 fixed to the shutter shaft 25, the movement of the arms being aided by means of the springs 42 and 43. The film grip device 35 is preferably carried by the cam arm 36 as clearly shown in Fig. 3 of the drawings, the whole construction being such that the intermittent grip device is driven from the shutter shaft with the parts therebetween reduced to a minimum. The film grip element 35 may be moved transversely of the film to engage and release the same during the intermittent operation thereof, and to this end the same may cooperate with a cam surface 46 suitably contoured and formed peripherally on the shutter belt wheel 26.

The mechanism for continuously moving the film preferably comprises the operating elements in the form of worms 47 and 48 fixed to the shutter shaft 25 at an end opposite the cam 41 and the said worms mesh with the upper and lower worm wheels 49 and 50 respectively (see Fig. 1), the said worm wheels being fixed to shafts 51 and 52 on one side of the machine frame 10, which shafts carry the upper and lower film engaging sprockets 53 and 54, the sprocket 54 being grooved to form a belt wheel over which is trained the belt 55 movable over a pulley 56 for driving the lower film take-up reel 57.

For manually adjusting the intermittent and continuous film moving parts without operating the motor 32, I provide the shutter shaft 25 with a finger wheel 58 fixed to the front end of the shaft, as clearly shown in Figs. 1 and 2 of the drawings. It will be apparent that by the provision of this means the main shutter shaft and the parts operated thereby may be partially manually rotated for adjustment purposes, the loose connection between the driving motor 32 and the shaft 25 permitting this manual operation.

For supporting the upper reel 57', I provide a rotatable stud 59 supported in a bracket arm 60, which arm is removably attachable to an upstanding portion 61 of the wall 20, the said arm being removably receivable by a recessed section 62 and secured in position by means of a thumbscrew 63. The supply film reel 57' may be manually rotated by means of a crank arm 64 fixed to the rotatable stud 59.

As heretofore stated, one of the principal objects of the invention includes the provision of a motion picture machine designed to serve as a film splicing and cutting machine, and more specifically, to the provision of a film splicing and cutting mechanism related to the supply and take-up reels in a manner to permit the user to join or splice the ends of film without the necessity of removing the reels from the machine, and obviating the use of additional apparatus usually employed for this purpose. To accomplish this object of the invention, I provide a film cutting and splicing mechanism generally designated as 65 arranged between the supply and take-up reels 57' and 57 so as to receive the ends of film directly therefrom, the said film cutting and splicing mechanism being designed in the form of an attachment removably attachable to the wall 20 of the frame casting intermediate the upper and lower film reels, as clearly shown in Figs. 1, 2 and 4 of the drawings.

The film cutting and splicing mechanism preferably comprises a pair of relatively movable sections $c$ and $d$, the section $c$ including a film locating plate 66 having the locating pins 67 thereon which receives the perforations in the motion picture film, and a complemental film clamping plate 68 movable relatively to the locating plate 66 and having the orifices 67' co-acting with the pins 67. The section $d$ also comprises a film locating plate 69 having the locating pins 70 and a film clamping plate 71 complemental to the locating plate 69 and having the orifices 70'.

The film cutting and splicing mechanism is provided with an arm or support 72 which threadedly receives the thumb screw 73, this forming the means for removably securing the film splicing attachment to the frame wall 10. The sections c and d of the film splicing attachment are positionable on opposite sides of the support 72 and wall 10 so that the section c is in position for receiving the film from the supply reel 57' and the section d is in position for receiving the film from the take-up reel 57, and to this end the clamping plate 68 and the plates 69 and 71 are hinged and movable about an axis provided by the shaft 74, which shaft is substantially in the plane of a support 72, as clearly shown in Figs. 4 and 5 of the drawings. The clamping plates 68 and 71 of both sections are narrower than the complemental locating plates, as clearly depicted in Fig. 5 of the drawings, and the edges of these plates cooperate with the complemental plates 66 and 69 to cut the film ends received by both of the sections, the construction being such that after the film ends are cut, exposed portions are produced which are adapted to receive adhesive for effecting the joint in a manner well known to those skilled in the art.

The motion picture apparatus of my present invention is adapted, as heretofore mentioned, for employment with combined motion picture and sound record film; and to this end I provide a sound film gate means positionable in the path of the continuously moving film and associated with the sound record portion of the film for illuminating the same. Referring to Fig. 1 of the drawings, I show the film gate means arranged between the upper continuously moving sprocket 53 and the supply reel 57', the said film gate means comprising relatively movable film gate sections 75 and 76 movable towards and from each other on the offset spindles 77 and 78 supported in the frame wall 10, the film gate sections being movable away from each other by operation of the handles 79 and 80 and being normally urged towards each other by the springs 81 and 82. The film gates are provided with apertures 83 and 84 which are offset relatively to each other (see Figs. 1 and 7), portions only of the apertures registering to produce a constricted light-admitting opening 85 for the photographic sound record on the film.

The shutter housing 24 is designed to carry a combined lamp house and condenser mount generally designated as e, the said lamp house and condenser mount forming a unit movable relatively to the shutter housing 24 on the hinge 86 and comprising the condenser lens casing 87 carrying the lamp housing 88 in which a lamp 89 is located, the same lamp being centered at its opposite ends by the lamp support 90 at one end and the tubular element 91 provided in the lamp house cap or cover 92. For projecting the images onto an image receiving surface, there is provided the projection lens system generally designated as f having a construction described and claimed in my aforementioned United States Patent No. 1,684,968.

The use and operation of my improved portable motion picture machine will in the main be fully apparent from the above detailed description thereof. In threading the film through the machine, the same is taken from the supply reel 57' and threaded through the gate sections 75 and 76 with the latter in open position, the film being then threaded over the sprocket 53 with which co-operate the presser rolls 93, and the film is then taken behind a guide roll 94 and threaded through the film gate and under a second guide roll 95, after which the same is threaded over the lower sprocket 54 with which cooperates the presser roll 96, the end of the film being then attached in the usual way to the lower film reel 57. For adjusting the operated parts to suitably frame the film, the main operating shaft is manually manipulated by operation of the finger wheel 58. Upon tearing of the film, the ends may be joined by the film cutting and splicing mechanism 65 without removing the film reels from the machine.

While I have shown my invention in the preferred form, it will be apparent that many changes and modifications may be made in the structure disclosed without departing from the spirit of the invention, defined in the following claims:

I claim:

1. A motion picture apparatus for the projection of motion pictures simultaneously with the reproduction of a sound record comprising intermittent and continuous film moving mechanism, a shutter shaft and a shutter thereon, the said shutter being peripherally formed to define a belt wheel, means connected to the shutter-belt wheel for driving the same constituting a lost motion connection between said mechanism and said shutter belt wheel, means for operating the intermittent and continuous film moving mechanism from the shutter shaft, and a finger wheel on said shaft for manually rotating the same.

2. A motion picture apparatus for the projection of motion pictures simultaneously with the reproduction of a sound record comprising a frame, a shutter shaft journalled therein, a combined drive wheel and shutter fixed to said shaft adjacent an end thereof, intermittent film moving mechanism, frictional means engaging said drive wheel periphery for actuating said shutter and said mechanism, and a finger wheel carried by the shaft at its opposite end for manually rotating the same.

3. A motion picture apparatus for the projection of motion pictures simultaneously with the reproduction of a sound record comprising a frame, driving mechanism carried thereby, a shutter shaft journalled on said frame, a combined drive wheel and shutter fixed to said shaft adjacent an end thereof, intermittent film moving mechanism, continuous film moving mechanism, means carried by said shaft at opposite ends thereof for operating the intermittent and continuous film moving mechanisms respectively, a lost motion connection between said driving mechanism and said shaft, and a finger wheel carried by said shaft at an end thereof for rotating the same independently of said driving mechanism.

4. A motion picture apparatus for the projection of motion pictures simultaneously with the reproduction of a sound record, comprising a frame, driving mechanism carried thereby, a shutter and shutter shaft journalled on said frame, means for intermittently moving the film including a cam carried by the shutter shaft adjacent an end thereof, means for continuously moving the film including worms carried by the shutter shaft adjacent the opposite end thereof, a lost motion connection between said driving mechanism and said shutter and a finger wheel carried by the shaft at the said opposite end for independently moving said shutter.

5. A motion picture apparatus for the projection of motion pictures simultaneously with the reproduction of a sound record comprising a frame, a driving mechanism, a shutter shaft journalled on said frame, a combined drive wheel and shutter on said shaft, means for intermittently moving the film including a cam carried by the shutter shaft adjacent an end thereof, means for continuously moving the film including worms carried by the shutter shaft adjacent the opposite end thereof, a lost motion connection between said driving mechanism and said shaft and a finger wheel carried by the shaft at the said opposite end for manually shifting said worms and shutter.

6. A motion picture apparatus comprising a driving mechanism, a shutter shaft, a shutter carried by said shaft, a lost motion connection between said driving mechanism and said shutter shaft at a position adjacent one end of said shutter shaft, a film moving mechanism disposed on opposite sides of said shutter shaft and driven there-thereby, and a hand grip on the end of said shaft for independently adjusting the position of said film moving mechanism and shifting said shutter to a selected position independently of the connection between said driving mechanism and said shutter.

7. A motion picture film apparatus comprising a frame, a shutter, driving mechanism including a shutter shaft journalled on said frame, means operable from the shutter shaft for intermittently moving the film past the shutter, means including sprockets and worm wheels for continuously moving the film, a pair of worms mounted on said shutter shaft each meshing with one of said worm wheels, one being a left-hand worm and the other being a right-hand worm, a lost motion connection between said driving mechanism and said shaft, and a finger wheel carried by said shaft for independently moving said shutter.

In testimony whereof I affix my signature.

FREEMAN H. OWENS.